United States Patent [19]

Hiraiwa et al.

[11] Patent Number: 4,774,068

[45] Date of Patent: Sep. 27, 1988

[54] METHOD FOR PRODUCTION OF MULLITE OF HIGH PURITY

[75] Inventors: Tadashi Hiraiwa; Eizi Ando; Kunihiro Miyazaki, all of Shiojiri, Japan

[73] Assignee: Showa Denko K. K., Tokyo, Japan

[21] Appl. No.: 884,601

[22] Filed: Jul. 11, 1986

[30] Foreign Application Priority Data

Jul. 15, 1985 [JP] Japan .................................. 60-154318

[51] Int. Cl.$^4$ ............................................ C01B 33/26
[52] U.S. Cl. ..................................... 423/327; 501/128; 423/330
[58] Field of Search ................................. 423/327, 330

[56] References Cited

U.S. PATENT DOCUMENTS

| 2,886,466 | 5/1959 | Iler et al. | 106/84 |
| 3,533,738 | 10/1970 | Rundell et al. | 423/330 |
| 3,904,741 | 9/1975 | Jones et al. | 423/462 |

FOREIGN PATENT DOCUMENTS

| 0953605 | 8/1974 | Canada | 423/327 |
| 0342247 | 1/1931 | United Kingdom | 423/330 |

*Primary Examiner*—H. M. S. Sneed
*Assistant Examiner*—Jackson Leeds
*Attorney, Agent, or Firm*—Oblon, Fisher, Spivak, McClelland & Maier

[57] ABSTRACT

Mullite of high purity is obtained by neutralizing an aqueous solution containing a basic aluminum salt and colloidal silica thereby causing formation of a precipitate in the aqueous solution, and subsequently heating the precipitate.

4 Claims, No Drawings

METHOD FOR PRODUCTION OF MULLITE OF HIGH PURITY

FIELD OF THE INVENTION AND RELATED ART STATEMENT

This invention relates to a method for the production of mullite powder of high purity, and more particularly to a method for inexpensively producing in a high yield the mullite powder of high purity as a material for sintered articles suitable as tubes for a semiconductor diffusion furnace, as cushions to be used in the treatment of electronic materials at elevated temperatures, and as heat-resistant structural members exhibiting excellent mechanical properties at elevated temperatures.

As oxide type refractory materials, alumina and mullite, which is a composite oxide of aluminum and silicon, have been used to date. Alumina has disadvantages such as a high thermal expansion coefficient, poor resistance to thermal shock, and loss of strength at elevated temperatures above the level of about 1000° C. Mullite which has been manufactured from such natural raw materials as kaoline and sillimanite has a disadvantage in that the properties thereof are degraded at elevated temperatures because an alkali component or a free silica component present in the raw materials forms a glass phase. In recent years, mullite has come to find growing utility as a material for devices used in the production of electronic parts. In this case, it is required to possess high purity.

As means of producing mullite which is free from the aforementioned disadvantage and meets the requirement of high purity, there is a method which comprises simply mixing $Al_2O_3$ powder of high purity with $SiO_2$ powder of high purity. As mentioned above, mullite is a composite oxide of alumina and silica. No matter how finely the raw materials, aluminum and silicon, may be comminuted, the product of their mixture is required to retain the component oxides at all times in the fixed ratio of $3Al_2O_3 \cdot 2SiO_2$. When the two powders are simply mixed, the individual particles of the resulting mixture remain as aggregates of $Al_2O_3$ and aggregates of $SiO_2$, no matter how finely they may be comminuted. It is substantially impossible to convert this mixture of $Al_2O_3$ powder and $SiO_2$ powder wholly into mullite by calcination.

As a better means than the powder mixing method described above, there are wet methods.

These wet methods produce mullite powder of high purity by hydrolyzing aluminum alkoxide and silicon alkoxide and further neutralizing the resulting hydrolyzate [J. of Am. Ceram. Soc., Vol. 55, No. 11, pp 548–552 (1972)] [Journal of Ceramics Society, Vol. 93, No. 1, pp 36–44]. One version of these methods uses $AlCl_3$ in the place of aluminum alkoxide. These wet methods invariably require use of expensive raw materials and strict control of the conditions for hydrolysis. In the case of the method using $AlCl_3$, the requirement that the Al concentration in the liquid should be not less than 65 g/liter ($Al_2O_3$ concentration 123 g/liter) is not practicable because the concentration exceeds the solubility and the amount of the solution to be handled is inevitably increased as a result. Further, the amounts of such neutralizing agents as ammonia and ammonium carbonate required for the neutralization per unit amount of the mullite to be produced are inevitably increased. At the same time, the amount of the neutralization product to be removed is consequently increased. Thus, it is difficult to realize efficient production of mullite with this method.

As mentioned above, mullite of perfect chemical structure cannot be produced by simply mixing the aforementioned two powders of high purity. With the wet methods, the raw materials are expensive and the conditions for the hydrolysis must be controlled with strictness.

OBJECT AND SUMMARY OF THE INVENTION

An object of this invention is to provide a method for the production of mullite of high purity in a high yield from cheap raw materials without requiring complicated control of reaction conditions.

The inventors made various studies with a view to attaining the object described above. They have consequently found that the object is attained by a wet method using a basic aluminum salt as an $Al_2O_3$ source and colloidal silica as a $SiO_2$ source. This invention has been perfected as a result.

To be specific, this invention concerns a method for the production of mullite of high purity, which comprises neutralizing an aqueous solution containing a basic aluminum salt and colloidal silica thereby inducing formation of a precipitate in the aqueous solution, then separating the precipitate from the aqueous solution, and heating the separated precipitate.

DETAILED DESCRIPTION OF THE PREFERRED EMBODIMENTS

The basic aluminum salt in the aqueous solution to be used in the method of this invention is prepared by causing an aqueous solution of a nitrate, a sulfate, a hydrochloride, or an acetate to react with metallic aluminum at a temperature exceeding 50° C., preferably exceeding 80° C. (up to 100° C.). It is otherwise prepared by dissolving $Al(OH)_3$ in an acid under prescribed conditions. The basic aluminum salt, in the case of a chloride, for example, is represented by the following general formula.

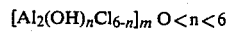
$[Al_2(OH)_nCl_{6-n}]_m$  $0 < n < 6$ wherein n generally stands for 3 and m for a value of not more than 10. Commercially available salt has a concentration of about 10% by weight as $Al_2O_3$. Prior to actual use in the present invention, therefore, this salt is required to further react with Al.

As concrete examples of the basic aluminum salt, basic aluminum nitrate, basic aluminum sulfate, and basic aluminum acetate can be cited.

As the colloidal silica for the purpose of this invention, commercially available colloidal silica can be used in its unmodified form. It may be prepared by hydrolyzing such an organic compound as silicon tetraethoxide, $[(C_2H_5O)_4Si]$, as shown by the following formula, for example.

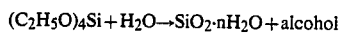
$(C_2H_5O)_4Si + H_2O \rightarrow SiO_2 \cdot nH_2O + alcohol$

In the method of this invention, a mixed aqueous solution containing a basic aluminum salt and colloidal silica is used. Now, the method for the preparation of this mixed solution will be described first. In this method, the aqueous solution may be obtained by adding colloidal silica and a basic aluminum salt in respective amounts calculated to give the mullite composition to water. Otherwise, at the time that a basic aluminum salt is formed by the reaction of an aluminum salt with metallic aluminum, colloidal silica is added to the reaction system so as to give rise to a mixture of the basic aluminum salt and the colloidal silica.

During the course of the reaction mentioned above, the concentration of the basic aluminum salt in the solution is in the range of 7.5 to 20 wt % as Al. The concentration of the colloidal silica is desired to be such that Al of the basic aluminum salt and Si of the colloidal silica, both in the aforementioned aqueous solution, will form a composition corresponding to the composition, $3Al_2O_3 \cdot 2SiO_2$, of mullite. For the concentration of Al to be heightened, the reaction must be continued for a long time. If the concentration of the basic aluminum salt exceeds 20 wt % (as Al) there ensues a disadvantage that the solution gains in viscosity and produces a precipitate. If this concentration falls short of 7.5 wt % the method proves impracticable because the concentration of $Al_2O_3$ is low and the amount of the solution to be handled is large.

Then, to this mixed solution, a neutralizing agent such as ammonia or ammonium carbonate is added to effect neutralization and induce formation of a precipitate. This precipitate is a homogeneous mixture of alumina hydrate represented by $Al_2O_3 \cdot 3H_2O$ and including $Al(OH)_3$ and silica hydrate represented by $SiO_2 \cdot 2H_2O$ and including $Si(OH)_4$. Subsequently, the resulting reaction solution is filtered to separate the precipitate as a residue. The separated precipitate is washed with water and then dried. This drying is effected by application of heat or exposure to a vacuum as generally practised. Otherwise, the separated precipitate may be admixed with an organic solvent, the resulting mixture distilled to expel the remaining water together with the organic solvent, and the residual precipitate dried suitably. When this heating is effected by application of heat as usually practised, since the precipitate is a slurry containing water, the water cannot be thoroughly removed. During the subsequent heating, therefore, the insufficiently dried precipitate undergoes thermal shrinking. The resulting clusters, on comminution, do not easily produce fine particles of uniform size. The practice of admixing the precipitate with an organic solvent such as alcohol, acetone, benzene, or xylene and drying the resulting mixture proves desirable because this prevents thermal shrinking.

The dried precipitate is subjected to a heat treatment at 950° to 1,300° C. and, when necessary, comminuted to obtain mullite powder.

If the temperature of the heat treatment does not reach 950° C., no mullite is obtained because no thorough reaction occurs between $Al_2O_3$ and $SiO_2$. When the powder produced is sintered, it gains in shrinkage. It therefore does not result in a desirable raw material for sintered products. If the heat treatment is carried out at a temperature exceeding 1,300° C., primary crystals grow at a sacrifice to the sintering property. Preparatory to the manufacture of a sintered product, therefore, the powder must be comminuted again or sintered at elevated temperatures.

The mullite powder obtained by the method of this invention described above has a primary particle diameter in the range of 200 to 500 Å, a specific surface area in the range of 20 to 60 m²/g, and a total $Al_2O_3 + SiO_2$ content of not less than 99%. It is a readily sintering microfine powder which, at 1,550° C., gives rise to a sintered product having a density of not less than 99% of theoretical density.

By a wet process using inexpensive, highly concentrated raw materials, this invention produces mullite powder of high purity suitable for the manufacture of highly desirable sintered products at low sintering temperatures. Thus, the present invention enjoys very high economic utility.

Now, this invention will be described more specifically below with reference to working examples. It should be noted, however, that this invention is not limited to these working examples.

EXAMPLE 1

In 600 ml of water, 240 g of aluminum chloride ($AlCl_3 \cdot 6H_2O$) was dissolved and 120 g of metallic aluminum powder was added and they were left to react with each other at 80° to 100° C. for two days and nights. After completion of the reaction, the reaction solution was filtered. As the filtrate, there was obtained an aqueous basic aluminum chloride solution having a concentration of 35% by weight as $Al_2O_3$. Then, to this aqueous solution, colloidal silica (product of Nissan Chemical Co., Ltd. and marketed under trademark "Snowtex O") was added in an amount calculated to yield a $SiO_2$ concentration of 28% by weight. Consequently, there was obtained a mixed solution having a basic aluminum salt concentration of 15.2% by weight as Al and a silicon concentration of 5.3% by weight. Then, this mixed solution was gradually added dropwise while under agitation to a solution of 100 ml of 25% aqua ammonia in 1,000 ml of water. After completion of this dropwise addition, the resulting mixture had a pH of 7 to 8. The colloid (precipitate) consequently produced in the resulting mixture was separated by filtration, washed with water, washed with acetone, then admixed with 2,000 ml of isopropyl alcohol and distilled. The residue of the distillation was dried to obtain a powder. This powder was sintered at 1,200° C. for two hours.

This sintered powder, on X-ray analysis, was confirmed to consist wholly of mullite crystals. This powder, in its uncomminuted state, had a specific surface area of 30 m²/g (as measured by the BET method) and a particle diameter of 200 Å as measured under an electron microscope.

Production of sintered article

The mullite powder produced in Example 1 was comminuted in a ball mill, molded under a pressure of 1 t/cm², and sintered at 1,550° C. to produce a sintered article. The density of this sintered article was 3.13, viz. 99% of the theoretical density.

EXAMPLE 2

The procedure of Example 1 was faithfully repeated, except that aluminum nitrate ($Al(NO_3)_3 \cdot 9H_2O$) was used in the place of aluminum chloride, colloidal silica obtained by hydrolysis of ethyl silicate was used in the place of colloidal silica, and the sintering temperature was changed to 1,250° C. The basic aluminum salt used in this example was basic aluminum nitrate (25% by weight as $Al_2O_3$).

The powder consequently obtained consisted wholly of mullite crystals. It was found to have a specific surface area of 50 m²/g and a particle diameter of 150 Å.

Production of sintered article

The mullite powder produced in Example 2 was comminuted, molded, and sintered by following the procedure of Example 1, to obtain a sintered article having a density of 3.15 (99.7% of the theoretical density).

EXAMPLE 3

A powder was obtained by following the procedure of Example 1, except that colloidal silica was added to the solution of aluminum chloride before the metallic aluminum powder was added to the solution. By heating this powder at 1,000° C., there was obtained mullite powder having a specific surface area of 60 m$^2$/g and a particle diameter of 150 Å.

Production of sintered article

A sintered article similar to that of Example 1 was obtained by subjecting the mullite powder to the same treatment as in Example 1.

COMPARATIVE EXPERIMENT 1

In 600 ml of water, 1,250 g of aluminum chloride (AlCl$_3$·6H$_2$O) was dissolved so as to yield the same Al$_2$O$_3$ concentratiton as in Example 1. No thorough solution was obtained, however, because the aluminum chloride concentration in the solution exceeded the solubility of the compound.

What is claimed is:

1. A method for the production of high purity mullite which has a particle size diameter ranging from 200 to 500 Å, a specific area ranging from 20 to 60 m$^2$/g, a combined Al$_2$O$_3$ and SiO$_2$ content of not less than 99 wt. % and having an ability to sinter easily, which comprises:

neutralizing an aqueous solution containing colloidal silica and from 7.5-20% by weight, as Al, of a basic aluminum salt prepared by the reaction of metallic aluminum and at least one salt selected from the group consisting of the nitrate, sulfate, hydrochloride and acetate salts of aluminum at a temperature within the range of 50° to 100° C., thereby inducing formation of a precipitate from said aqueous solution;

separating said precipitate from said aqueous solution;

mixing said precipitated material still containing water with an organic solvent;

distilling the resulting mixture to expel water from the precipitate together with the organic solvent;

drying the precipitate obtained; and heating the separated precipitate to form the mullite product, said mullite not exhibiting thermal shrinkage as a result of said organic solvent treatment.

2. The method of claim 1, wherein the concentration of said colliodial silica in said aqueous solution is such that the aluminum of said basic aluminum salt and silicon in said colloidal silica will for a composition corresponding to the composition of mullite.

3. The method of claim 1, wherein said separated precipitate is heated to a temperature within the range of 950° to 1300° C.

4. The method of claim 1, wherein said organic solvent is an alcohol, acetone, benzene or xylene.

* * * * *